US005170307A

United States Patent [19]

Nacewicz et al.

[11] Patent Number: 5,170,307

[45] Date of Patent: Dec. 8, 1992

[54] MOUNTING APPARATUS FOR ELECTRICAL MOTOR CONTROL COMPONENTS

[75] Inventors: Stanley J. Nacewicz, Plainville; Richard C. Ellis, East Bridgewater; Alfred Raulino; Richard L. Jenne, both of Attleboro, all of Mass.

[73] Assignee: Texas Instruments Incorporated, Dallas, Tex.

[21] Appl. No.: 708,535

[22] Filed: May 31, 1991

[51] Int. Cl.[5] .............................................. H02H 5/04

[52] U.S. Cl. ....................................... 361/24; 361/23; 310/68 C

[58] Field of Search ...................... 361/23, 24, 26, 27, 361/32; 337/107, 102; 310/68 C; 439/849

[56] References Cited

U.S. PATENT DOCUMENTS

| | | | |
|---|---|---|---|
| 4,319,299 | 3/1982 | Woods et al. | 361/24 |
| 4,492,886 | 1/1985 | Bar | 310/68 C |
| 4,701,824 | 10/1987 | Beggs et al. | 310/24 |
| 4,862,306 | 8/1989 | Lisauskas | 361/24 |

*Primary Examiner*—Steven L. Stephan
*Assistant Examiner*—Matthew Nguyen
*Attorney, Agent, or Firm*—Russell E. Baumann; Richard L. Donaldson; Rene E. Grossman

[57] ABSTRACT

A split phase electric motor starter and protector are shown having a housing which receives a PTC starter switch and a motor protector and provides various wiring options for connecting the PTC switch and, if desired, a capacitor to a motor depending upon the particular requirements of an application. The housing optionally accommodates a capacitor support bracket.

19 Claims, 11 Drawing Sheets

MOUNTING APPARATUS FOR ELECTRICAL MOTOR CONTROL COMPONENTS

BACKGROUND OF THE INVENTION

This invention relates generally to electric motors and more specifically to means for mounting motor starters, protectors and capacitors for use with split phase electric motors.

Room air conditioners, particularly for refrigeration compressors, typically comprise an hermetic enclosure in which is contained an evaporator, condenser, motor and other related components. The motor, conventionally a single split phase motor having a main winding and an auxiliary winding, is energized through three conductive pins disposed in a glass header mounted in a wall of the enclosure. Within the enclosure the pins are coupled to the main and auxiliary windings. Outside the enclosure it is conventional to mount a motor starting device, a motor protector and, depending upon torque, noise and efficiency requirements, a capacitor. That is, the main and auxiliary windings have different ratios of inductive reactance to resistance and are connected in parallel to magnetize the core of the motor. Line current is split into two parts so that a time displacement of thirty or more electrical degrees exist between them. To provide different starting torque and mechanical (noise) performance characteristics there are both standard and capacitor motors in common use. Capacitor motors are further divided as capacitor start, permanent-split capacitor and two value capacitor motors. Further variations include capacitor start induction run and resistance start capacitor run using a positive temperature coefficient resistor for starting. Each type has its own characteristics with regard to starting or running torque, noise and efficiency.

Split phase motors are used in a wide variety of applications in addition to refrigeration compressors such as, by way of example, room air conditioners, freezers, blowers and fans, washing machines, centrifugal pumps, etc. Depending on the requirements of the particular application anyone of the above noted split phase motors could be employed, each having special handling requirements, sizing, wiring and locating considerations.

BRIEF SUMMARY OF THE INVENTION

It is an object of the present invention to provide apparatus which can be used with any of the above noted split phase motors for accommodating the motor starter, protector and, if employed, capacitor. Yet another object is the provision of mounting apparatus for a motor starter, motor protector and run capacitor in which conventional capacitor lead wires are eliminated. Another object is the provision of a universal package which can be used with standard as well as capacitor split phase motors. Still another object is the provision of a housing which will receive quick connect terminals with low insertion forces and yet cannot be removed without a tool and a method for removing such terminals.

Briefly, in accordance with the invention, a housing is formed of electrically insulating material having a bottom wall and upstanding sidewalls. First and second header pin apertures are formed in the bottom wall with a double ended female pin connector disposed on the bottom wall in alignment with each aperture and locked in place with a projection of a sidewall extending through a cutout in each connector. An electrically conductive plate lies on the bottom wall and is electrically connected to one of the female pin connectors. An electrically conductive, resilient contact is attached to the plate and receives thereon a PTC element. Another electrically conductive plate and resilient contact are disposed on top of the PTC element and, in certain embodiments, are electrically connected to the other female pin connector. Mounting the PTC pill horizontally allows the provision of a seating area which will accept a range of pill sizes as well as provide improved thermal cycling characteristics. That is, the plate system employed results in decreasing the cool down time of the PTC compared to conventional vertically mounted PTC elements.

A cover of electrically insulative material is received on the upstanding sidewalls and has first and second apertures which are adapted to receive therethrough respective first and second legs of a capacitor support bracket formed of electrically insulative material. An electrical conductor is embedded in and extends along the length of the legs of the bracket. A first end of each conductor is received in a respective recess of a terminal block joining one end of each leg and is formed into a loop having opposed generally parallel segments with one segment having a centrally disposed portion projecting toward the other segment to accommodate capacitor terminal blades which may be somewhat askew and to securely engage a terminal inserted therein. The second end of each conductor extends a selected distance beyond the distal free end of each leg. The first and second legs are receivable through the respective first and second apertures in the cover and are adapted to engage an end of a respective electrically conductive arm which extends from one of the conductive plates or a jumper to an intermediate terminal seat in alignment with the apertures in the cover. An elongated capacitor support arm extends generally 90° from the bracket legs and has an end portion movably receivable in an aperture formed in a tab formed on the capacitor.

The housing is provided with a closed sidewall loop configured to receive therein a motor protector. The motor protector is receivable on one header pin with the other header pins received in the respective first and second header pin apertures with the cover extending over the looped sidewall. A tubular lead guide is formed in the top cover in alignment with the loop portion and is provided with a unidirectional wedge portion on an internal surface to lock a motor protector quick connect lead therein so that upon removing of the housing from the pins the motor protector will remain with the housing and be removed from its pin to simultaneously disconnect the apparatus with no live parts exposed. According to a feature of the invention an aperture is formed in the cover in alignment with each pin receiving aperture in the bottom wall and has a downwardly extending sidewall around a least a portion of the aperture. The apertures in the cover in alignment with the pin receiving apertures have a cutout portion adapted to receive an elongated tool having a camming surface through a respective cutout portion to release a quick connect connector which had previously been inserted through such aperture and locked to a respective blade of a double ended pin connector. An elevated platform is formed on the top wall of the cover and is adapted to receive a mounting strap to lock the housing to a compressor. According to another feature of the invention a curved rib is provided extending downwardly from the bottom wall and is adapted to fit around the header sleeve to transmit forces applied to the housing directly to the compressor housing. According to yet another feature of the invention a tab is formed on the conductive plate lying on the bottom wall over an aperture through the bottom wall to provide optional electrical contact thereto.

DESCRIPTION OF THE DRAWINGS

Other objects, advantages and specific features of the novel and improved mounting apparatus of this invention appear in the following detailed description of the preferred embodiment of the invention, the detailed description referring to the drawings in which.

DESCRIPTION OF THE PREFERRED EMBODIMENTS

Figure 1:
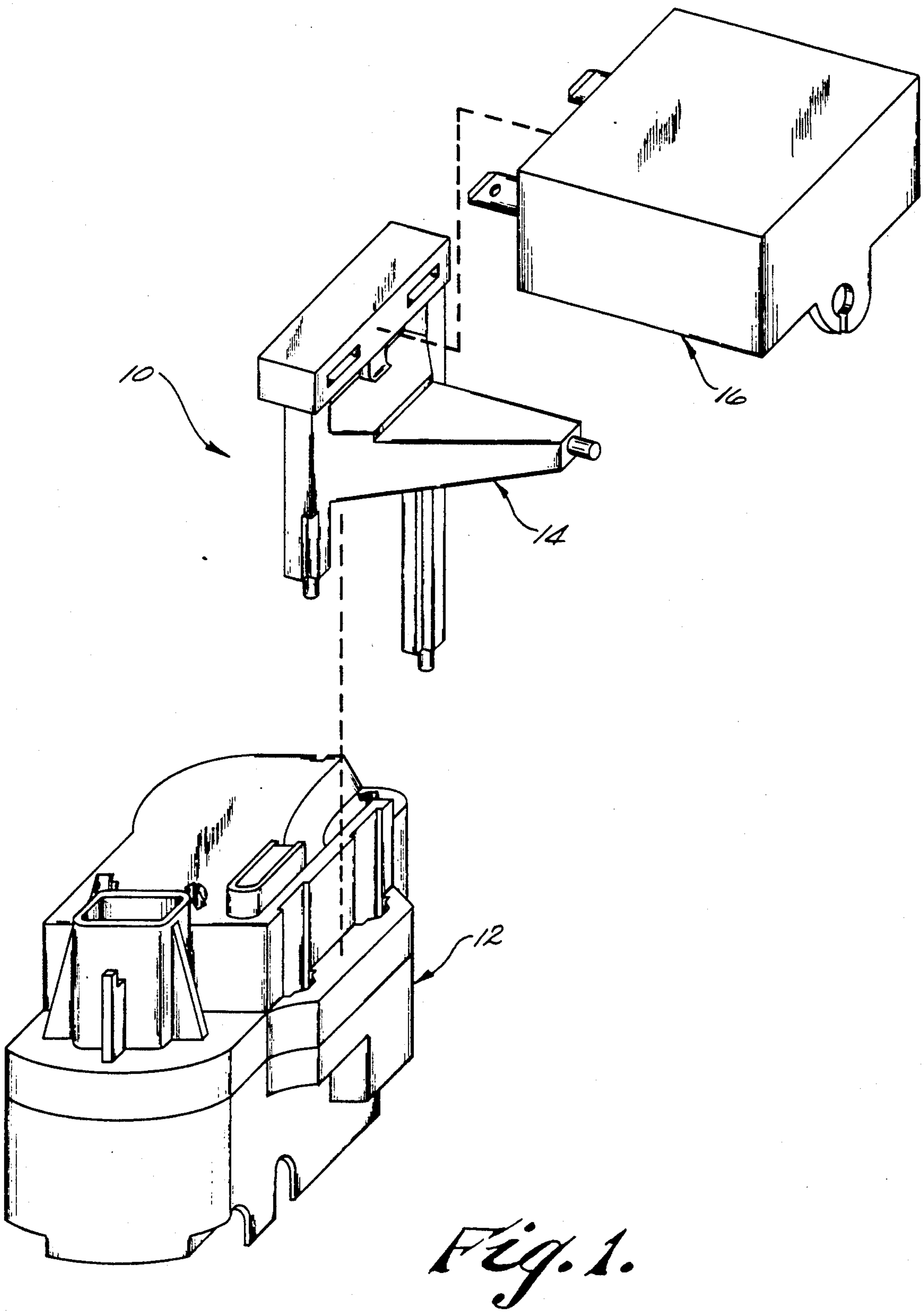
FIG. 1 is a blown apart perspective view of the mounting apparatus made in accordance with the invention.
Figure 2:
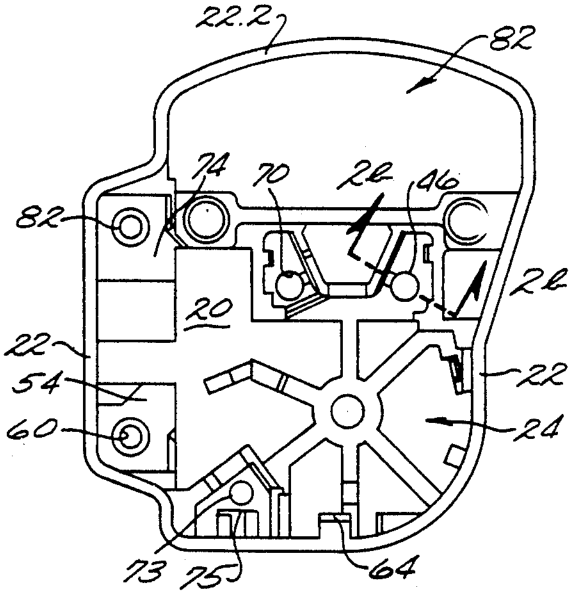
FIG. 2 is a top plan view of the housing shown in FIG. 1 with its cover removed and without any components disposed therein.
Figure 2A:
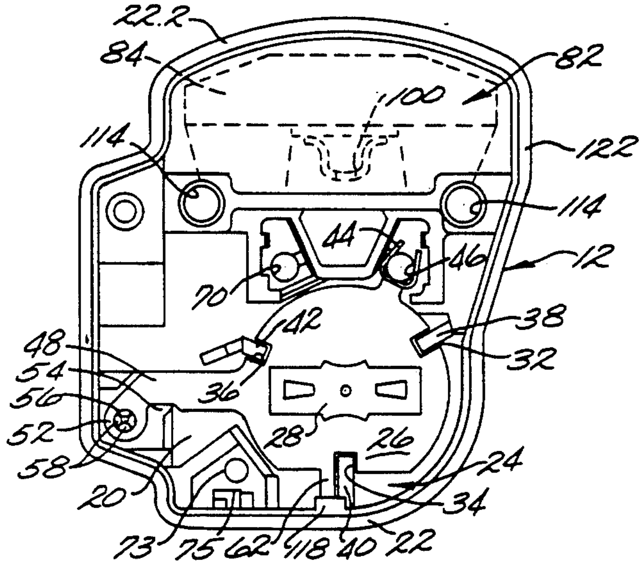
FIG. 2*a* is a top plan view of the housing shown in FIG. 2 but with a bottom electrically conductive plate installed.
Figure 2B:
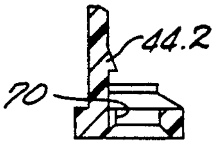
FIG. 2*b* is a cross sectional view taken on lines 2*b*—2*b* of FIG. 2.
Figure 7:
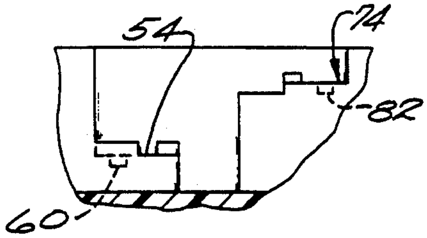
FIG. 7 is a side view of a broken away portion of the housing showing two intermediate terminal seats.

Referring to the drawings, mounting apparatus 10 for electrical motor control components made in accordance with the invention comprises a housing 12, a capacitor support 14 and a capacitor 16 shown in FIG. 1. With particular reference to FIG. 2 which shows a housing 12 with its cover removed before placing any internal parts therein and FIG. 2*a*, similar to FIG. 2 but shown with several internal components inserted which will be described below, the housing is formed with a bottom wall 20 and upstanding sidewalls 22. The housing is formed with a first cavity portion 24 in which a motor starting positive temperature coefficient (PTC) of resistivity switch is disposed and is therefore formed of suitable electrically insulative material such as Ryton R4 a trademark of Phillips Petroleum Company for polyphenylene-sulfide resin or Durez 25378 a trademark of Durez Company for phenolic which is capable of being subjected to relatively high temperature conditions. The PTC switch comprises a bottom electrically conductive plate 26 of suitable material such as phosphor bronze which lies on bottom wall 20 as seen in FIGS. 2*a*, 4*a* and 4*b*. An electrically conductive resilient contact member 28 which may be formed of suitable material such as stainless steel is electrically and mechanically attached to plate 26 in any suitable manner as by welding. Contact member 28 is generally U-shaped with its bight portion attached to plate member 26 and the distal free ends of its arms adapted to engage distal free ends of its arms adapted to engage a conventional PTC element such as a generally cylindrical element or disc 30 (see FIGS. 3*a*, 3*b*, 3*c*) of doped barium titanate having conductive coatings provided on opposite faces thereof (not shown). Plate 26 preferably is provided with orientation slots 32, 34, 36 to interact with respective ribs 38, 40, 42 projecting upwardly from bottom wall 20 to locate the plate 26 in a selected position. Plate 26 is also formed with an integrally attached double ended female pin connector 44 which is disposed in alignment with a first pin receiving aperture 46 formed in bottom wall 20 and with an integrally attached arm 48 having an end portion 52 extending laterally to a first intermediate terminal seat 54. End portion 52 is formed with an aperture 56 having a plurality of tabs 58 extending into the aperture. End portion 52 is received on terminal seat 54 with apertures 56 aligned with a recessed portion 60 of the terminal seat (FIG. 7). As seen in 4*b* pin connector 44 has a cutout 44.1. Plate 26 is inserted into cavity portion 24 with cutout 44.1 receiving projection 44.2 (FIG. 2*b*) therethrough to securely retain the connector in place. A similar cutout is provided on connector 68 to be discussed below to cooperate with a corresponding projection at its seat. Connector 44 is provided with a terminal blade 44.3 for connecting to a quick connect lead received through an aperture in the cover for certain wiring options to be discussed below.

Plate 26 may also be formed with a tab 62 which extends laterally toward sidewall 22 over an aperture 64 in bottom wall 20 (FIG. 8) so that electrical connection can be made thereto by a contact member extending through aperture 64 if desired.

Figure 3A:
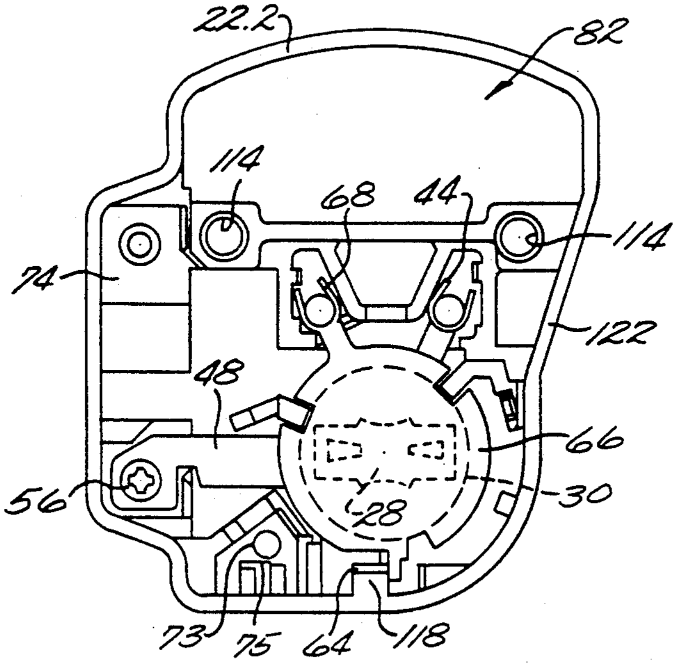
FIGS. 3*a*, 3*b* and 3*c* are top plan views of the housing shown in FIG. 2 with the PTC element in place with alternate top electrically conductive plate means.
Figure 3B:
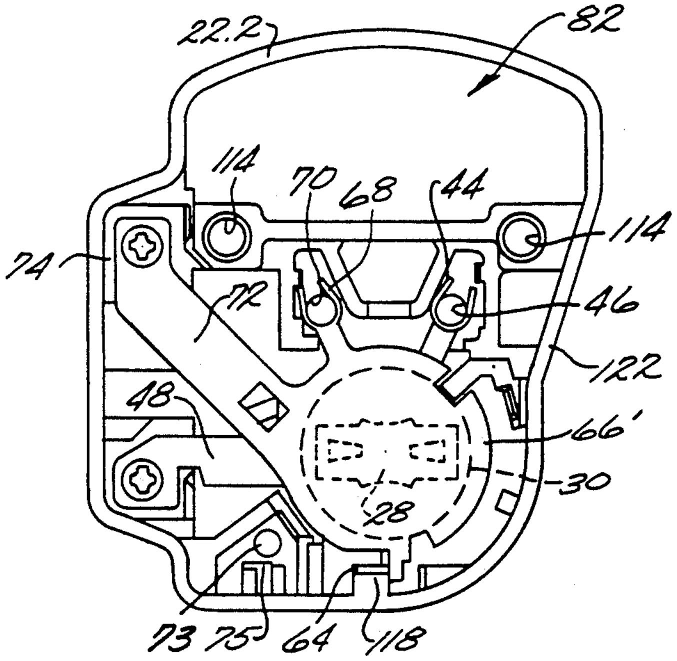
Figure 3C:
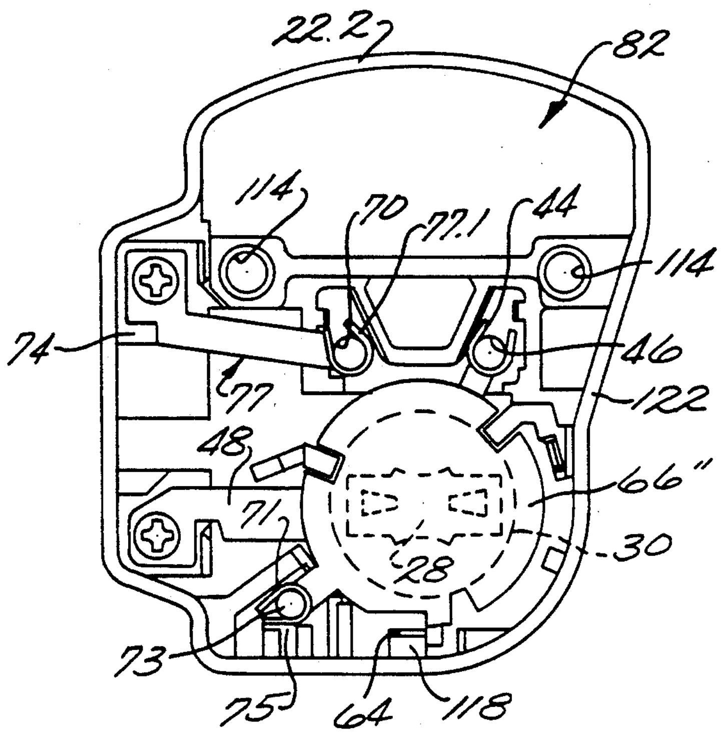
Figure 4A:
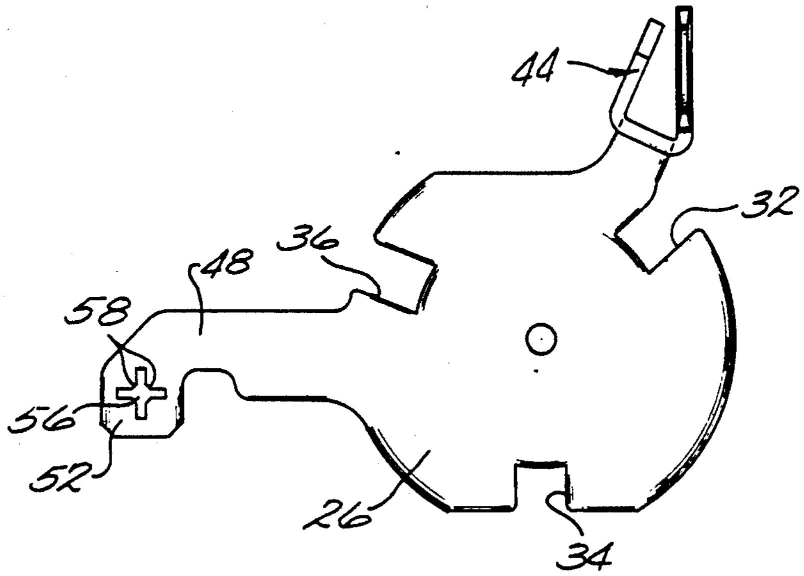
FIGS. 4*a* and 4*b* are top and side views respectively of a bottom conductive plate shown in FIG. 3*b;*
Figure 4B:
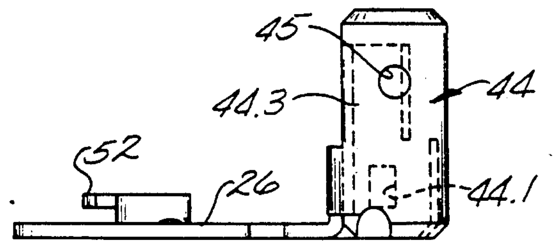
Figure 4C:
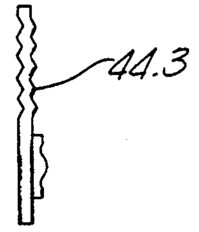
FIG. 4*c* is an end view of a portion of an alternative blade of the double ended female connector which can be used with the top and bottom conductive plates.

FIGS. 3*a*, 3*b* and 3*c* show several different electrical connection alternatives which can be provided for different types of split phase motors. In each alternative PTC element 30 is received on resilient contact 28 and a top conductive contact plate with another resilient contact member 28 connected thereto is disposed on top of the PTC element 30. One of the features of the present invention is that housing 12 is configured such that it can readily be received within the existing fences and covers provided on the majority of compressors. Mounting plates 26 and 28 horizontally on bottom wall 20 of the housing results in being able to accept a range of PTC element sizes and still stay within the confines dictated by such fences. The housing made in accordance with the invention can accommodate PTC element sizes anywhere from 12 mm to 21 mm in diameter. Further, placing the bottom plate horizontally on bottom wall 20 results in improved thermal cycling characteristics by reducing the cool down time of the PTC element decreasing the power consumption or without materially affecting the switching point of the PTC element. This improved result is related, at least in part, to the heat sinking effect of the plate and bottom wall which is not obtained in the conventional vertically mounted PTC element starting switches.

Figure 5A:
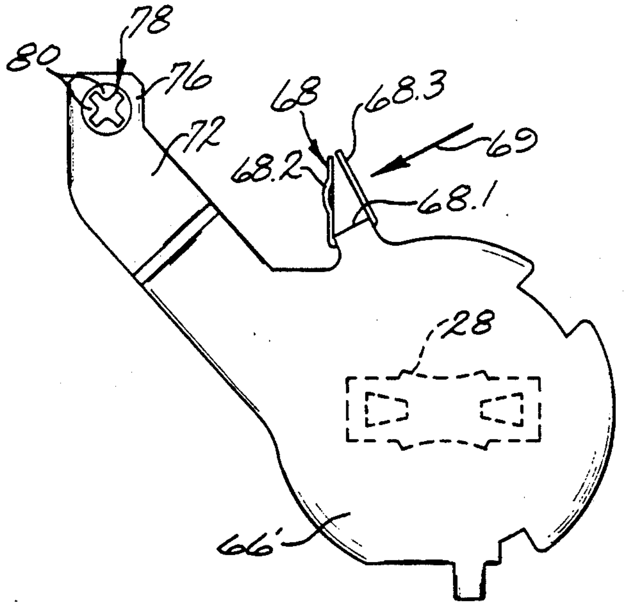
FIG. 5*a* is a top plan view of a top contact plate and FIG. 5*b* is a side view of the FIG. 5*a* conductive plate taken in the direction of arrow 69.
Figure 6A:
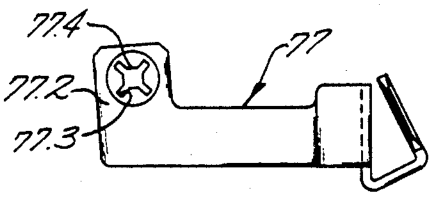
FIGS. 6*a* and 6*b* are top and side views respectively of a pin connector/jumper shown in FIG. 3*c.*
Figure 6B:
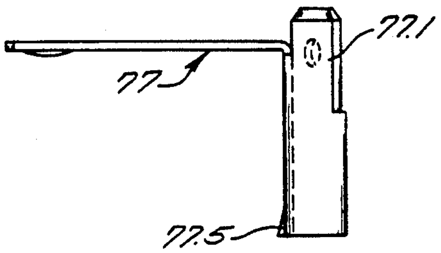

As seen in FIG. 3*a* which shows electrical connection for a resistance start motor a female pin connector 68 is integrally attached to plate 66 and is aligned with a second pin receiving aperture 70 formed in bottom wall 20. Arm 48 attached to bottom conductive plate 26 can be removed or, if desired it can be used to provide electrical connection to a lead inserted through bore 56 through an aperture in the cover to be discussed below. Connections for an inductive start, capacitor run or resistance start capacitor run motor in which a second integrally attached electrically conductive arm 72 is provided which extends laterally from plate 66′ to a second intermediate terminal seat 74. As best seen in FIG. 5*a*, end 76 of arm 72 is provided with an aperture 78 in which a plurality of tabs 80 extend, the apertures being in alignment with a recess 82 (FIG. 7). FIG. 3*c* shows a variation used in conjunction with a capacitor start, capacitor run motor in which top conductive plate 66″ has an integrally attached female connector 71 disposed over a peg 73 adjacent an aperture 75 in bottom wall 20 through which a contact probe can be inserted to engage connector 71 or connection can be made through an aperture in the cover in alignment with peg 73 as will become clear when the cover is discussed in detail below. Jumper 77 has a blade connector portion 77.1 aligned with a pin receiving aperture 70 and extends to end 77.2 in which an aperture 77.3 having tabs 77.4 extending therein (see FIGS. 6*a, b*) is received on intermediate terminal seat 74. Depending on the material used and its thickness bullet lead-in 77.5 may be provided.

Figure 9:
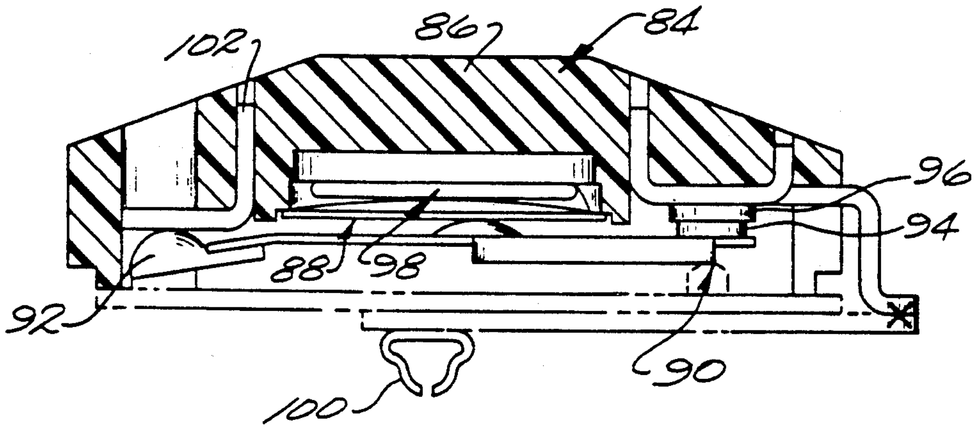
FIG. 9 is a partial cross section and a partial schematic view of a motor protector receivable in the FIGS. 3*a*, 3*b*, 3*c* housing.
Figure 10:
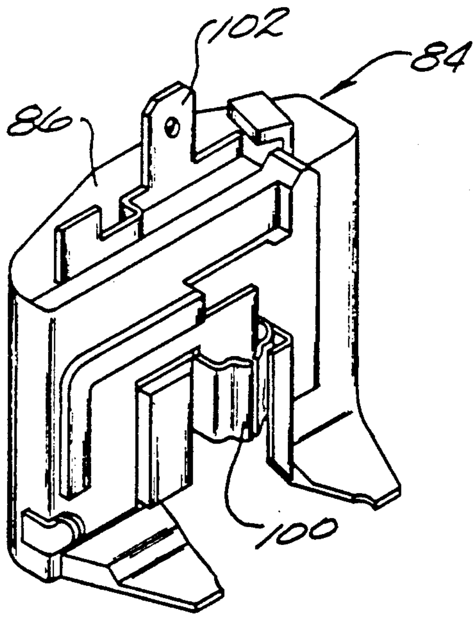
FIG. 10 is a perspective view of the FIG. 9 motor protector.

Sidewall 22 is formed with a loop 22.2 to form an open tubular portion 82 configured to compliment the shape of a selected motor protector, such as that shown in FIGS. 9 and 10, and to receive such a motor protector therein. As seen in FIG. 9, motor protector 84 comprises an electrically insulative base portion 86 mounting a snap acting disc 88 formed of thermostat metal which is movable between opposite dished configurations in response to temperature. A movable contact arm 90 cantilever mounted at 92 has a movable electrical contact 94 mounted on a free end thereof adapted to move into and out of electrical engagement with stationary contact 96 in response to the dished configuration of disc 88. An electrical resistance heater means 98 is electrically coupled to the motor circuit current to heat the thermostat disc. When the disc snaps to the configuration opposite to that shown in FIG. 9 it will bias the free end of arm 90 away from stationary contact 96 to interrupt the current. Resilient female pin connector means 100 is adapted to be received on a header pin while terminal means 102 is adapted for connection to a power source. As seen in dashed lines in FIG. 2*a* motor protector 84 in effect floats within loop portion 22.2 with its female pin connector 100, along with female pin connector 44 and 68, receivable on the header pins of a compressor. A detailed description of motor protector 84 is set forth in U.S. Pat. No. 4,241,370 which is incorporated herein by this reference.

Pin connectors 44, 68 and 77.1 are formed with the female connector portion having vertical walls defining a pin receiving opening configured, relative to a plane passing vertically through the walls, generally as a triangle having a base and an open vertex formed by the legs extending from the base which are spaced relative to one another so that a pin received in the opening forces the legs apart to provide a secure electrical connection as well as a self-centering mechanism for the respective plate or jumper arm to reduce stresses which could otherwise occur.

Figure 5B:
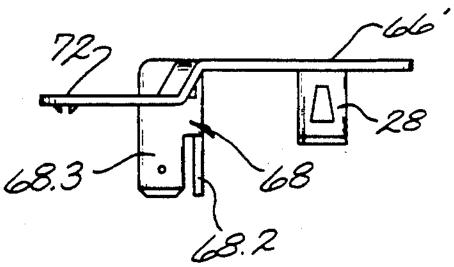

As seen, for example, in FIGS. 5*a* and 5*b* connector 68 has a base portion 68.1 with legs 68.2 and 68.3 extending therefrom toward each other but having end portions spaced apart to form an open vertex. A pin inserted between walls 68.2 and 68.3 with force the legs apart slightly and will center plate 66′ automatically aligning connector 68 with the pin.

Although motor protector 84 is free to float within loop 22.2 so that misalignment relative to a pin to be inserted into connector 100 does not cause a problem, normally if a misaligned pin is forced into a conventional female connector such as connector 100 the connector can be spread apart resulting in ineffective electrical engagement with the pin.

Figure 13:
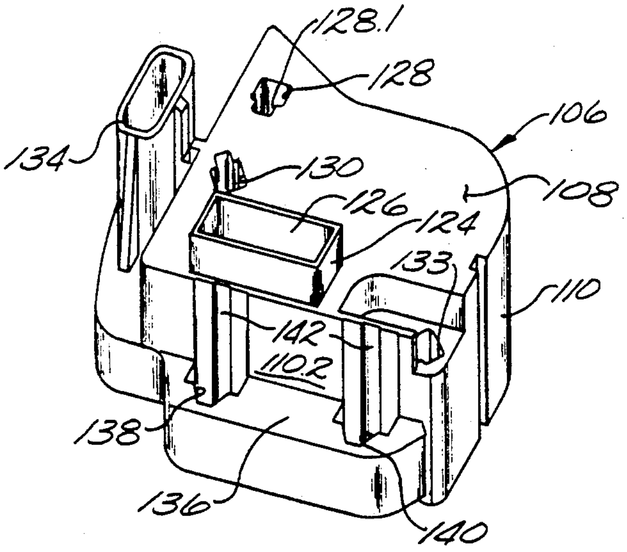
FIG. 13 is a perspective view looking down at the cover of the housing.
Figure 14:
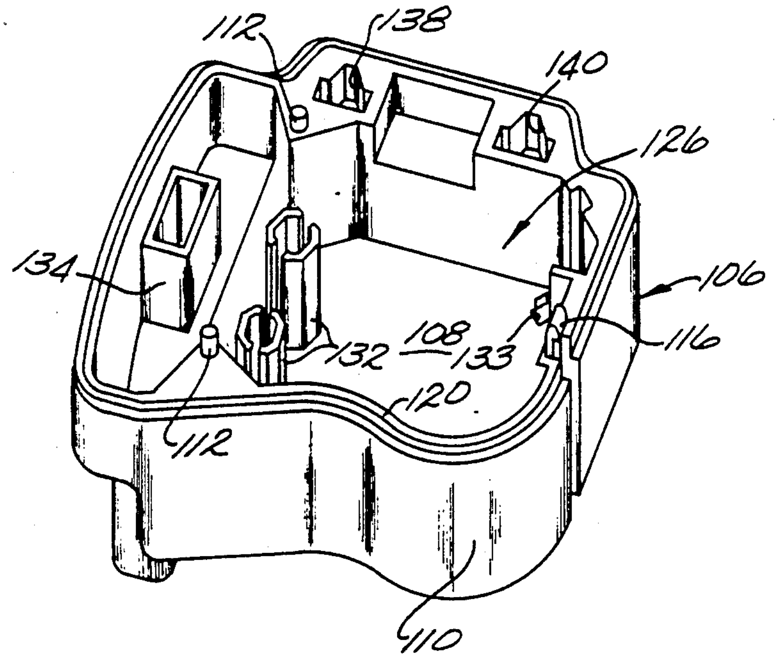
FIG. 14 is a view similar to FIG. 13 but looking up at the cover.

FIGS. 13 and 14 show a cover 106 adapted to be received on upstanding wall 22 including loop portion 22.2. Cover 106 has a top wall 108 with depending sidewalls 110. Cover 106 is formed of a suitable electrically insulative material such as Noryl N225, a trademark of General Electric for polyphenylene oxide (PPNOX), PPO-phenylene oxide, or Celanex for polybutylene terephthalate, which has lower high temperature capability and therefore is less expensive than housing 12 which mounts PTC element 30 and also provides excellent impact resistance. Cover 106 is formed with downwardly depending pins 112 having a projecting portion 112.1 which are adapted to be received in bores 114 of housing 12 with portion 112.1 captured beyond the thickness of the portion of the housing through which bores 114 extend. A downwardly extending tab 116 having an outwardly extending lip is adapted to be received under a shelf 118 of enabling the housing and cover to snap together. A raised platform 124 having a groove area 126 extends above top surface 108 to serve as a strap guide. That is, after placing the housing on compressor header pins a strap can be placed over the housing to secure it to the compressor housing.

The length of sidewalls 110 of cover 106 preferably are selected to form a cavity 126 to accommodate optional components, such as a coil for applications such as those shown in copending application Ser. No. 442,802 assigned to the assignee of the present invention. In that application a relay coil is placed in series with the main winding and contacts are provided to deenergize a PTC starter at a predetermined main winding current.

Figure 13A:
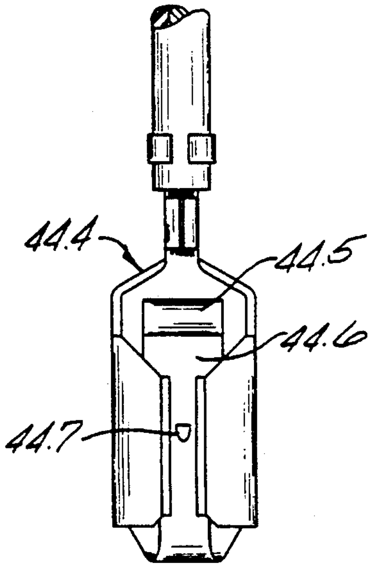
FIG. 13*a* and 13*b* are front and side views respectively of a female quick connect terminal useful with the invention.
Figure 13B:
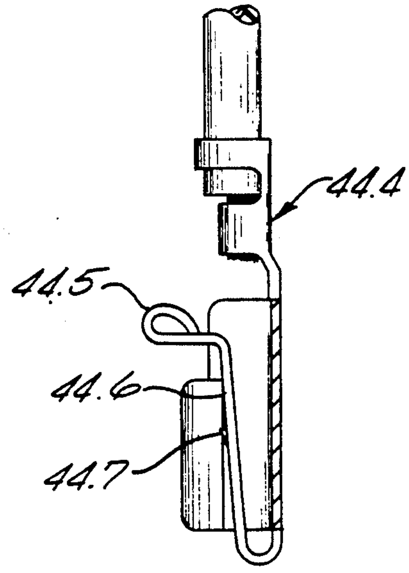
Figure 13C:
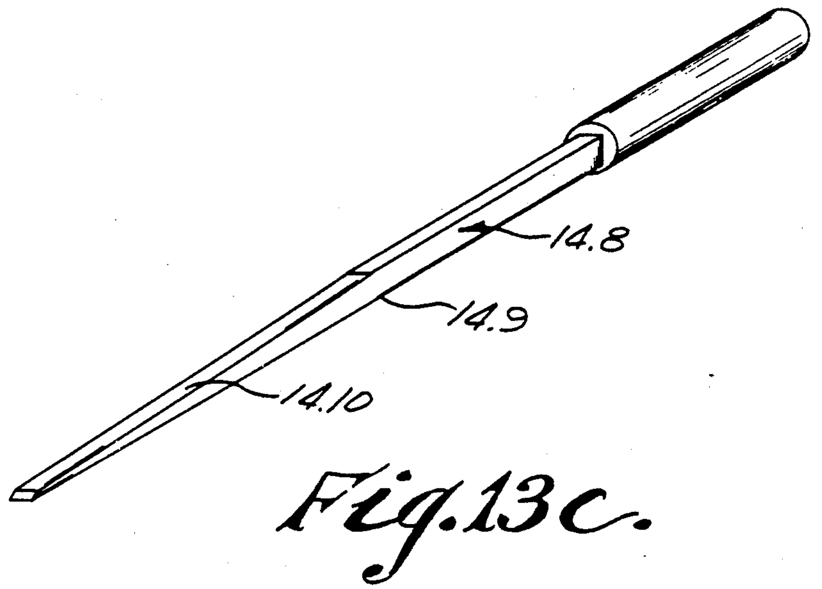
FIG. 13*c* is a perspective view of a tool used with the quick connect terminal of FIGS. 13*a* and 13*b* to unlock the terminal.

Top wall 108 of cover 106 is formed with first and second apertures 128, 130 therethrough aligned respectively with first and second pin receiving apertures 46, 70 and have sidewalls 132 contiguous to the apertures 128, 130 extending slightly beyond sidewall 110 to serve as a guide in cases where it is desirable to make electrical connection with female connectors 44, 68 from above the housing. For example, such connection would facilitate connection to a remote capacitor. A quick connect lead such as 44.4 shown in FIGS. 13*a* and 13*b* is received in aperture 128 shown in FIG. 11 with the distal free end 44.5 of tongue 44.6 of the quick connect riding in rectangular cutout portion 128.1 shown in FIGS. 11 and 13 until projection 44.7 in tongue 44.6 is received in aperture 45 of the blade portion of terminal 44 (FIG. 4*b*). Once the projection is received in aperture 44.3 quick connect 44.4 is locked thereto. If it is desired to remove the lead a special elongated tool 14.8 shown in FIG. 13*c* can be inserted through cutout portion 128.1 with flat surface portion 14.9 sliding along the inside surface of wall 132 (FIG. 14) until tapered surface portion 14.10 engages distal portion 44.5 of tongue 44.6 moving tongue 44.6 inwardly (to the right as seen in FIG. 13*b*) to release projection 44.7 from aperture 44.3 of the connector blade and the lead and tool can then be extracted together as, in effect, a single element. All of the connector blades are provided with locking apertures similar to 44.3, including the terminal blade of the motor protector, to provide a positive locking function with tool 14.8 required for removal of the respective lead. Cutout portions 130.1 and 133.1 are provided for apertures 130, 133 respectively for that purpose. A third aperture 133 is formed in cover 106 in alignment with optional terminal area 71 shown in FIG. 3*c* discussed supra.

Figure 8:
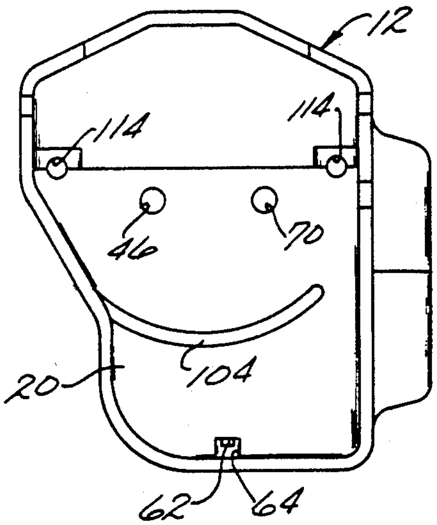
FIG. 8 is a bottom plan view of the FIG. 2 housing.
Figure 11:
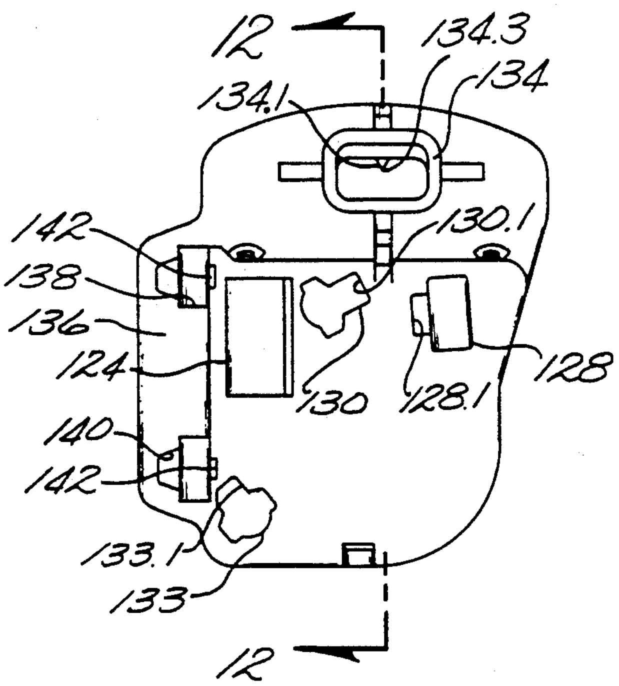
FIG. 11 is a top plan view of the housing cover.
Figure 12:
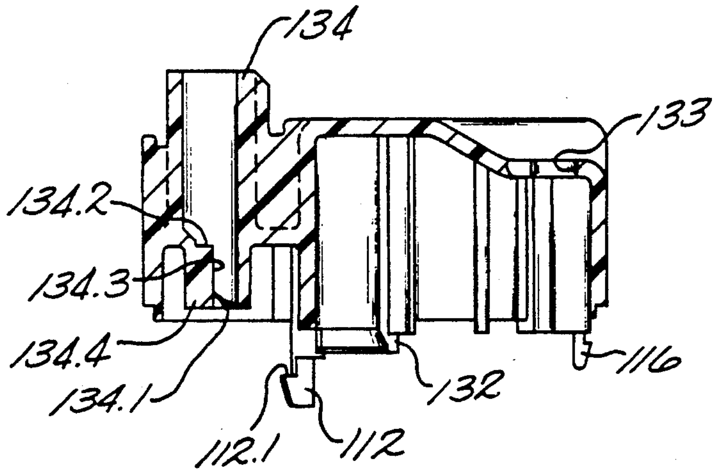
FIG. 12 is a section view taken on line 12—12 of FIG. 11.

A power lead guide 134 is aligned with and is in communication with the interior of tubular portion 82 to accommodate reception of a power supply quick connector to be connected to the protector 84. As seen in FIGS. 11 and 12 guide 134 comprises a tubular wall portion and is provided with a diamond shaped unidirectional wedge 134.1 having a knife edge 134.2 facing outwardly, or upwardly as seen in FIG. 12, and a knife edge 134.3 facing inwardly in the tubular wa-11 portion. The wedge has a flat base portion 134.4 facing downwardly as seen in FIG. 12. When a quick connect lead is inserted into guide 134 to receive terminal blade 102 (FIG. 10) wedge 134.1 will guide the lead so that it will properly seat and lock onto terminal blade 102 and when the housing is removed from the pins the wedge jams against the quick connect resulting in locking the motor protector to the housing so that both the housing and the protector will be removed simultaneously with no live parts exposed. With reference to FIG. 8, an arcuately extending rib 104 depends downwardly from bottom wall 20 and is adapted to fit closely adjacent to the collar or sleeve portion of the compressor header so that lateral forces exerted on housing 12 will be transferred to the compressor housing.

A capacitor mounting platform 136 is integrally attached to cover 106 and is formed with first and second bracket leg apertures 138, 140 one side of which being contiguous with sidewall portion 110.2 Guide grooves 142 extending along the height of cover 108 are formed in wall portion 110.2 in alignment with each aperture 138, 140.

Figure 15:
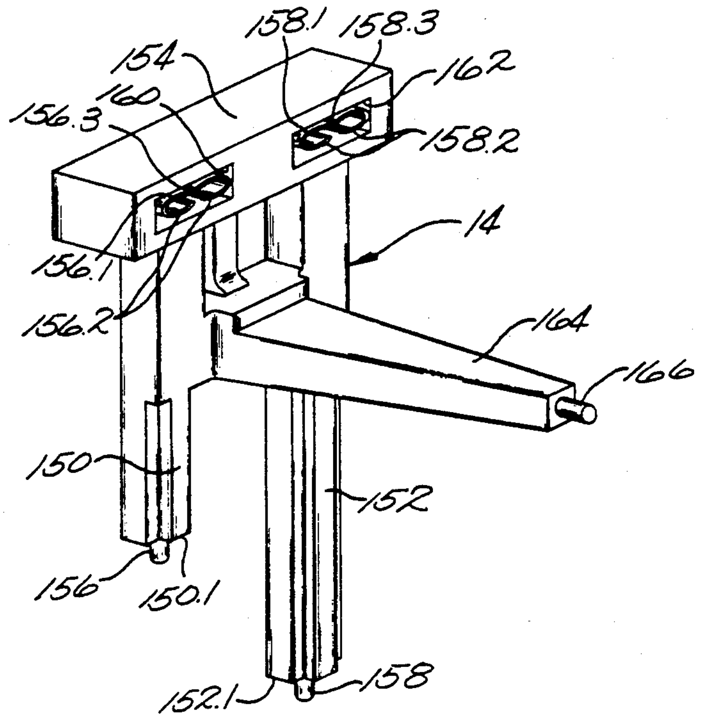
FIG. 15 is a perspective view of a capacitor support bracket.
Figure 15A:
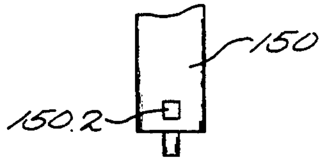
FIG. 15*a* is a back elevational view of a portion of one of the legs of the FIG. 15 bracket.

With reference to FIGS. 15 and 15*a*, a capacitor support bracket 14 composed of suitable electrically insulative material such as Noryl N225 or Celanex 4300 a trademark of Celanese Corporation for polybutylene terephthalate, has first and second parallel legs 150, 152 extending from a terminal block 154. Legs 150, 152 each has embedded therein a respective electrical conductor 156, 158 preferably formed of steel cored copper. Conductors 156, 158 have first and second ends, the first end of which extends into a respective recess 160, 162 and is bent into a loop having parallel segments 156.1, 156.2, 158.1, 158.2, with segments 156.1 and 158.1 having a centrally disposed portion 156.3, 158.3 respectively, projecting toward segment 156.2, 158.2 respectively to accommodate capacitor terminal blades which may be askew in good electrical engagement upon insertion into the conductive loops. The second end of each conductor 156, 158 extends beyond the distal free end of respective support bracket legs 150.1, 152.1. A capacitor support means in the form of an elongated arm 164 extends generally 90° from legs 150, 152 and is provided with a generally cylindrical outer distal end 166. As seen in FIG. 15*a* a small protrusion 150.2 is formed on the rear lower portion of leg 150, a similar one is also formed on leg 152 but is not shown, which is adapted to ride in grooves 142 of cover 108 and bottom out at the end of grooves 142 as will be explained below.

Figure 16:
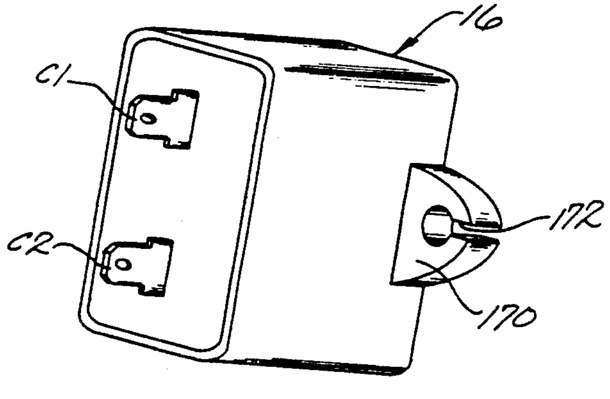
FIG. 16 is a perspective view of a capacitor receivable on the FIG. 15 bracket.

A capacitor 16 shown in FIG. 16 having blade terminals Cl, C2 at one end is provided with a locking tab 170 extending from an opposite end. Tab 170 has an opening 172 which is adapted to clampingly receive distal end 166 of arm 164.

In applications wherein it is desired to employ a capacitor, capacitor 16 is placed on support 14 with terminal C2 received between loop segments 158.1, 158.2 in electrical engagement with projection 158.3, terminal Cl between loop segments 156.1, 156.2 in electrical engagement with projection 156.3 and distal end 166 received in opening 172 of tab 170. With cover 108 disposed on housing 12 and conductive arms 48, 72 shown in FIG. 3*b*, legs 150, 152 are inserted through apertures 138, 140 respectively, the protrusions on the rear of the legs riding in grooves 142 until they bottom out against the end of the groove (FIG. 11). As legs 150, 152 are inserted into the cavity 24 of housing 12 the second ends of conductors 156, 158 approach distal end portions 76, 52 respectively and eventually are inserted through respective apertures 78, 56 with tabs 80, 58 making electrical engagement with the respective conductors and being locked thereto.

One of the advantages that the capacitor mounting and electrical connector bracket made in accordance with the invention offers is that by slightly modifying the bracket various capacitors can be accommodated regarding specific sizes, as well as varying the specific location of the capacitor in response to temperature limitations of the capacitor chosen without any changes required in the housing or in wiring provisions while meeting appropriate safety code requirements.

It will be appreciated that housing 12 and cover 106 can be used without support bracket 14 and capacitor 16 in applications where a capacitor is not desired. For example, a lead can be inserted through aperture 140 into electrical contact with arm 48 as discussed supra with respect to FIG. 3*a*. On the other hand when a capacitor is desired it can easily be added to the housing and cover without having to provide additional wiring connections and the like. By using appropriate electrical connections described above the starting switch can be used with virtually any split phase motor.

An additional advantage provided by the invention is the elimination of the cover normally required for electrical enclosure required by safety organizations since the function is provided by the mounting apparatus of the invention.

The present invention has been described by way of certain preferred forms of realization. It will be understood, however that variations and modifications can be made in the same without departing from the scope of the invention.

What is claimed:

1. Mounting apparatus for electrical motor control components comprising a housing formed of electrically insulative material having a bottom wall and sidewalls upstanding therefrom, first and second pin receiving apertures formed in the bottom wall, a female pin connector disposed on the bottom wall in alignment with each pin receiving aperture, a positive temperature coefficient element disposed in the housing, means to electrically connect the PTC element to the female pin connectors, a capacitor bracket comprising first and second parallel legs each extending from a terminal block to a free distal end, the terminal block having first and second recessed portions, an electrical conductor having first and second ends embedded in each leg, the first end of each conductor extending into a respective recessed portion and the second end of each conductor extending beyond the respective free distal end, means on the bracket to support a capacitor with capacitor terminals of a selected thickness receivable in the respective first and second recessed portions for electrical connection with the respective electrical conductors, first and second intermediate terminal seats formed in the housing, first and second electrically conductive arm electrically coupled to the means to electrically connect the positive temperature coefficient element to the female pin connectors and extending respectively to the first and second intermediate terminal seats, the distal ends of the first and second legs removably receivable through the respective apertures in the cover with the second ends of the electrical conductor extending out of the legs in electrical with the respective first and second electrically conductive arms at the respective intermediate terminal seat.

2. Mounting apparatus for electrical motor control components according to claim 1 in which the first end of the conductors extending into the recessed portions are formed into a loop, each having an upper and lower segments which are generally straight and parallel with one another and spaced apart by a distance which is more than the thickness of a selected capacitor terminal, one segment having a generally central portion projecting toward the other segment.

3. Mounting apparatus for electrical motor control components according to claim 2 in which the means on the bracket to support a capacitor comprises an elongated arm extending generally 90° from the legs and having a free distal end, the capacitor having a tab with an opening formed therein, the free distal end of the elongated arm receivable in the opening in the tab.

4. Mounting apparatus for electrical motor control components according to claim 1 in which the means on the bracket to support a capacitor comprises an elongated arm extending generally 90° from the legs and having a free distal end, the capacitor having a tab with an opening formed therein, the free distal end of the elongated arm receivable in the opening in the tab.

5. Mounting apparatus for electrical motor control components according to claim 1 in which the first and second pin receiving apertures formed in the bottom wall are adjacent one sidewall of the housing, the housing further formed with a sidewall having two opposite end portions which loops around from one end portion to the opposite end portion of the sidewall to form an open ended enclosure, a motor protector having a female pin connector received in the open ended enclosure, the female connectors being aligned with the first and second pin receiving apertures and being located so as to be receivable on two pins and the motor protector female pin connector receivable on a third pin of a conventional compressor terminal connector header.

6. Mounting apparatus for electrical motor control components according to claim 1 in which an arcuately configured rib extends downwardly from the bottom wall adjacent the first and second pin receiving apertures, the rib being adapted to transfer lateral forces placed on the mounting apparatus to a collar of a header having connector pins when the mounting apparatus is placed on the header pins.

7. Mounting apparatus for electrical motor control components according to claim 1 in which the means to electrically connect the PTC element to the pin connectors includes a first electrically conductive plate member lying on the bottom wall.

8. Mounting apparatus for electrical motor control components according to claim 7 in which the means to electrically connect the PTC element to the pin connectors further includes a first electrically conductive spring means disposed on the first electrically conductive plate member, the PTC element having first and second opposed face surfaces, one of the first and second opposed face surfaces received on the first spring means, second electrically conductive spring means disposed on the second opposed face surface, and a second electrically conductive plate member disposed on the second spring means.

9. Mounting apparatus for electrical motor control components according to claim 7 in which an aperture is formed in the bottom wall in alignment with a portion of the first electrically conducting plate member.

10. Mounting apparatus for electrical motor control components according to claim 9 in which the portion of the first electrically conducting plate member is a tab extending outwardly therefrom.

11. Mounting apparatus for electrical motor control components according to claim 1 in which the cover has a top wall formed with first and second apertures aligned with the respective first and second pin receiving apertures in the bottom wall.

12. Mounting apparatus for electrical motor control components according to claim 11 in which the cover has a third aperture in alignment with one of the intermediate terminal seats.

13. Mounting apparatus for electrical motor control components according to claim 11 in which an extending wall depends downwardly contiguous to the first and second apertures in the top wall.

14. Mounting apparatus for electrical motor control components according to claim 11 further including a raised platform formed in the top surface of the cover adapted to receive a strap on said raised portion to secure the mounting apparatus to a compressor shell.

15. Mounting apparatus for electrical motor control components according to claim 1 in which the cover has a top wall formed with an aperture in alignment with an alternate top plate connector.

16. Mounting apparatus for electrical motor control components according to claim 1 in which the first and second electrically conductive arms each has a distal end portion received at the intermediate terminal seats, the distal end portions each formed with an opening having a first diameter, a plurality of tab portions extending into the opening to a second diameter to make good electrical connection with an electrical conductor having an outer diameter intermediate the first and second diameters.

17. Mounting apparatus for electrical motor control components comprising a housing having a bottom wall and sidewalls upstanding therefrom, first and second pin receiving apertures adjacent one of said sidewalls, a fist electrically conductive plate member disposed on the bottom wall, first and second intermediate terminal seats formed adjacent another sidewall, first electrically conductive spring means disposed on the first electrically conductive plate member, a positive temperature coefficient element having first and second opposed face surfaces, one of the first and second opposed face surfaces of the positive temperature coefficient element received on the spring means, second electrically conductive spring means disposed on the second opposed face surface on the positive temperature coefficient element, a second electrically conductive plate member disposed on the second spring means, a female pin connector disposed on the bottom wall in alignment with each pin receiving apertures, the first plate member electrically coupled to a female pin connector, the second plate member electrically coupled to another female pin connector, a first electrically conductive arm electrically coupled to the first plate member and extending to the first intermediate terminal seat, a second electrically conductive arm electrically coupled to the second plate member and extending to the second intermediate terminal seat, a capacitor bracket comprising first and second parallel legs each extending from a terminal block to a free distal end, an elongated arm extending generally 90° from the legs and having a free distal end, the terminal block having first and second recessed portions, an electrical conductor having first and second ends embedded in each leg, the first end of each conductor extending into a respective recessed portion and the second end of each conductor extending beyond the respective free distal end, the arm adapted to support a capacitor with capacitor terminal receivable in the respective recessed portions for electrical connection with respective electrical conductors, a cover having an aperture aligned with each of the first and second intermediate terminal seats, the distal ends of the first and second legs removably received through the respective apertures in the cover with the second end of the electrical conductor extending out of the legs in electrical engagement with the respective first and second electrically conductive arms at the respective intermediate terminal seat.

18. Mounting apparatus for electrical motor control components comprising a housing having a bottom wall and sidewalls upstanding therefrom, a first electrically conductive plate member disposed on the bottom wall, first electrically conductive spring means disposed on the first electrically conductive plate member, a positive temperature coefficient element having first and second opposed face surfaces, one of the first and second opposed face surfaces of the positive temperature coefficient element received on the spring means, second electrically conductive spring means disposed on the second spring means, a capacitor bracket comprising first and second parallel legs each extending from a terminal block having first and second recessed portions, an electrical conductor having first and second ends embedded in each leg, the first end of each conductor extending into a respective recessed portion and the second end of each conductor extending beyond the respective free distal end, the arm adapted to support a capacitor with capacitor terminals receivable in the respective recessed portions for electrical connection with respective electrical conductors, a cover having first and second leg apertures, the distal ends of the first and second legs removably received through the respective apertures in the cover and electrical connection means for connecting the first and second electrically conductive plate members and the second ends of the electrical conductors in accordance with a selected motor type.

19. Mounting apparatus for electrical motor control components comprising a housing formed of electrically insulative material having a bottom wall and sidewalls upstanding therefrom, first and second pin receiving apertures formed in the bottom wall, a female pin connector disposed on the bottom wall in alignment with each pin receiving aperture, a positive temperature of coefficient element disposed in the housing, means to electrically connect the positive temperature of coefficient element to the pin connectors, the female pin connectors being formed by vertically disposed walls forming a pin receiving opening, the walls configured, relative to a plane passing vertically through the walls, generally as a triangle having a base and an open vertex formed by first and second legs extending from the base, and the means to electrically connect the positive temperature coefficient element to the pin connectors including a conductive member extending from the base.

* * * * *